United States Patent
Komeya (10) Patent No.: US 10,661,751 B2
(45) Date of Patent: May 26, 2020

(54) VEHICLE CONTROL SYSTEM, VEHICLE CONTROL METHOD IN VEHICLE CONTROL SYSTEM, PORTABLE DEVICE, CONTROL METHOD FOR PORTABLE DEVICE, IN-VEHICLE CONTROLLER, AND CONTROL METHOD FOR IN-VEHICLE CONTROLLER (71) Applicant: TOYOTA JIDOSHA KABUSHIKI KAISHA, Toyota-shi, Aichi-ken (JP)

(72) Inventor: Masashi Komeya, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 20 days.

(21) Appl. No.: 15/917,732

(22) Filed: Mar. 11, 2018

(65) Prior Publication Data
US 2018/0257604 A1 Sep. 13, 2018

(30) Foreign Application Priority Data
Mar. 13, 2017 (JP) ................................. 2017-047704

(51) Int. Cl.
B60R 25/24 (2013.01)
H04W 12/08 (2009.01)
(Continued)

(52) U.S. Cl.
CPC .............. B60R 25/24 (2013.01); B60R 25/01 (2013.01); H04L 63/102 (2013.01);
(Continued)

(58) Field of Classification Search
CPC ........ B60R 2325/103; B60R 2325/205; B60R 25/01; B60R 25/24; H04L 63/102;
(Continued)

(56) References Cited

U.S. PATENT DOCUMENTS

2012/0158213 A1* 6/2012 Talty ........................ B60R 25/24
701/2
2013/0099892 A1* 4/2013 Tucker ............... G07C 9/00309
340/5.61
(Continued)

FOREIGN PATENT DOCUMENTS

CN 106558128 A 4/2017
JP 2010-023548 A 2/2010
(Continued)

Primary Examiner — Tyler J Lee
(74) Attorney, Agent, or Firm — Hunton Andrews Kurth LLP (57) ABSTRACT A vehicle control system includes a portable device configured to store information on an electronic lock of a vehicle and an in-vehicle controller configured to communicate with the portable device, the in-vehicle controller being installed in the vehicle. The in-vehicle controller is configured to generate a permission command to permit the specific operation to be performed when the in-vehicle controller determines that the operation requested to be performed on the vehicle is a specific operation that needs permission from the authorized user, in-vehicle controller when the in-vehicle controller determines that the portable device is within a predetermined range around the vehicle, and when the in-vehicle controller determines that near field communication between the portable device and the communication terminal based on a first telecommunications standard is established.

10 Claims, 5 Drawing Sheets (51) Int. Cl.
*H04L 29/06* (2006.01)
*B60R 25/01* (2013.01)
*H04W 12/04* (2009.01)
*H04W 12/06* (2009.01)
*H04L 29/08* (2006.01)

(52) U.S. Cl.
CPC ............ *H04L 63/107* (2013.01); *H04L 67/12* (2013.01); *H04W 12/04* (2013.01); *H04W 12/06* (2013.01); *H04W 12/08* (2013.01); *B60R 2325/103* (2013.01); *B60R 2325/205* (2013.01)

(58) Field of Classification Search
CPC ...... H04L 63/107; H04L 67/12; H04W 12/04; H04W 12/06; H04W 12/08
See application file for complete search history.

(56) References Cited

U.S. PATENT DOCUMENTS

| | | | |
|---|---|---|---|
| 2014/0357248 A1* | 12/2014 | Tonshal | H04M 1/6091 455/418 |
| 2015/0063329 A1* | 3/2015 | Frye | H04W 48/02 370/338 |
| 2016/0241695 A1* | 8/2016 | Elliott | H04M 1/6091 |
| 2016/0335895 A1* | 11/2016 | Lui | B60R 25/24 |
| 2017/0092030 A1* | 3/2017 | Badger, II | B60R 25/102 |
| 2018/0053416 A1 | 2/2018 | Sanji et al. | |

FOREIGN PATENT DOCUMENTS

| | | |
|---|---|---|
| JP | 2016-182855 A | 10/2016 |
| WO | 20160152060 A1 | 9/2016 |

\* cited by examiner

| ECU | SPECIFIC OPERATION CODE |
|---|---|
| ECU31 | ID001 |
| ECU32 | ID002 |
| ECU33 | ID003 |
| ECU34 | ID004 |
| ⋮ | ⋮ |

FIG. 4A

| ECU | OPERATION CODE |
|---|---|
| ECU31 | ID001 |
| | ID011 |
| | ⋮ |

FIG. 4B

| ECU | OPERATION CODE |
|---|---|
| ECU32 | ID002 |
| | ID012 |
| | ⋮ |

VEHICLE CONTROL SYSTEM, VEHICLE CONTROL METHOD IN VEHICLE CONTROL SYSTEM, PORTABLE DEVICE, CONTROL METHOD FOR PORTABLE DEVICE, IN-VEHICLE CONTROLLER, AND CONTROL METHOD FOR IN-VEHICLE CONTROLLER

INCORPORATION BY REFERENCE

The disclosure of Japanese Patent Application No. 2017-047704 filed on Mar. 13, 2017 including the specification, drawings and abstract is incorporated herein by reference in its entirety.

BACKGROUND

1. Technical Field

The disclosure relates to a vehicle control system, a vehicle control method in a vehicle control system, a portable device, a control method for a portable device, an in-vehicle controller, and a control method for an in-vehicle controller.

2. Description of Related Art

In the related art, there is a vehicle function limiting system including an electronic key that transmits a key code to a vehicle via wireless communication to perform key collation with the vehicle and that can limit the uses of the vehicle with the electronic key when the vehicle is used by means of the electronic key. On a condition that operating means that is an operating system of the electronic key is operated through an authorized procedure, it is possible to limit a vehicle function that can be used by means of the electronic key (for example, refer to Japanese Unexamined Patent Application Publication No. 2010-023548 (JP 2010-023548 A)).

SUMMARY

However, with the vehicle function limiting system in the related art, a function that is set to be unavailable cannot be made available as needed although a portion of the functions of a vehicle that can be operated by using a portable device (electronic key) can be set to be unavailable. For example, when a vehicle is left for valet parking in a state where a function of opening a trunk is set to be unavailable, it is not possible to make the trunk be opened by a valet parking staff as needed.

Therefore, the disclosure provides a vehicle control system, a vehicle control method in a vehicle control system, a portable device, a control method for a portable device, an in-vehicle controller, and a control method for an in-vehicle controller in which a function that is set to be unavailable can be made available as needed in a state where a portion of the functions of a vehicle is set to be unavailable.

A first aspect of the disclosure relates to a vehicle control system including a portable device and an in-vehicle controller. The portable device is configured to store information on an electronic lock of a vehicle. The in-vehicle controller is configured to communicate with the portable device, the in-vehicle controller being installed in the vehicle, the portable device or the in-vehicle controller having a function of communicating with a communication terminal of an authorized user of the vehicle. The in-vehicle controller is configured to determine whether an operation requested to be performed on the vehicle is a specific operation that needs permission from the authorized user, determine whether the portable device is within a predetermined range around the vehicle in which communication is performed when the in-vehicle controller determines that the operation requested to be performed on the vehicle is the specific operation, determine whether near field communication between the portable device and the communication terminal based on a first telecommunications standard is established or whether near field communication between the in-vehicle controller and the communication terminal based on the first telecommunications standard is established when the in-vehicle controller determines that the portable device is within the predetermined range, and generate a permission command to permit the specific operation to be performed when the in-vehicle controller determines that the near field communication based on the first telecommunications standard is established.

As described above, when the specific operation that needs permission from the authorized user is performed on the vehicle, the portable device configured to store information on the electronic lock of the vehicle is within the predetermined range around the vehicle in which communication is possible, and the near field communication between the portable device and the communication terminal of the authorized user of the vehicle based on the first telecommunications standard is established, the permission command is generated to permit the specific operation to be performed. That is, in a case where the authorized portable device configured to store the information on the electronic lock of the vehicle and the communication terminal of the authorized user of the vehicle are inside the vehicle or near the vehicle, the permission command is generated to permit the specific operation to be performed.

Accordingly, it is possible to provide a vehicle control system in which a function that is set to be unavailable can be made available as needed in a state where a portion of the functions of a vehicle is set to be unavailable.

In the vehicle control system according to the first aspect of the disclosure, the in-vehicle controller may be configured not to determine whether the near field communication based on the first telecommunications standard is established and not to generate the permission command when the in-vehicle controller determines that the portable device is not within the predetermined range.

As described above, in a case where the portable device configured to store the information on the electronic lock of the vehicle is not present within the predetermined range around the vehicle in which communication is possible, the determination on whether the near field communication based on the first telecommunications standard is established is not made and the permission command is not generated.

Accordingly, in a case where the portable device configured to store the information on the electronic lock of the vehicle is not present within the predetermined range around the vehicle in which communication is possible, performing the specific operation is not permitted even when the specific operation is performed, and thus it is possible to improve the security of the vehicle in the viewpoint of preventing theft.

In the vehicle control system according to the first aspect of the disclosure, the in-vehicle controller may be configured to be connected to the communication terminal via communication based on a second telecommunications standard with a communication range wider than a communication range of the near field communication and to cause the communication terminal to display an operation screen on which whether to permit the specific operation to be performed is input when the in-vehicle controller determines that the near field communication based on the first telecommunications standard is not established. The in-vehicle controller may be configured to determine whether an operation of permitting the specific operation has been performed on the communication terminal connected to the in-vehicle controller by the authorized user. The in-vehicle controller may be configured to generate the permission command to permit the specific operation to be performed when the in-vehicle controller determines that the operation of permitting the specific operation has been performed.

As described above, the authorized user can determine whether to permit the specific operation to be performed through the communication terminal as needed in a case where the authorized user entrusts another person with the vehicle and the other person performs the specific operation, and the specific operation to be performed is made possible in a case where the specific operation is permitted.

Accordingly, it is possible to provide a vehicle control system in which a function that is set to be unavailable can be made available as needed in a state where a portion of the functions of a vehicle is set to be unavailable even in a case where an authorized user entrusts another person with the vehicle.

In the vehicle control system according to the first aspect of the disclosure, the in-vehicle controller may be configured to store specific operation information representing the specific operation. The in-vehicle controller may be configured to determine whether the operation requested to be performed on the vehicle is the specific operation by comparing the operation requested to be performed on the vehicle with the stored specific operation information.

As described above, since the specific operation information representing the specific operation is on the in-vehicle controller side, it is possible to determine whether an operation requested to be performed on the vehicle is the specific operation with ease in a case where an operation is performed on the vehicle.

Accordingly, it is possible to provide a vehicle control system in which it is possible to reliably determine whether the operation requested to be performed on the vehicle is the specific operation on the in-vehicle controller side and in which a function that is set to be unavailable can be made available as needed in a state where a portion of the functions of a vehicle is set to be unavailable.

A second aspect of the disclosure relates to a vehicle control method in a vehicle control system which includes a portable device configured to store information on an electronic lock of a vehicle and an in-vehicle controller configured to communicate with the portable device, the in-vehicle controller being installed in the vehicle, the portable device or the in-vehicle controller having a function of communicating with a communication terminal of an authorized user of the vehicle. The vehicle control method includes performing a process of causing the in-vehicle controller to determine whether an operation requested to be performed on the vehicle is a specific operation that needs permission from the authorized user, determine whether the portable device is within a predetermined range around the vehicle in which communication is performed when the in-vehicle controller determines that the operation requested to be performed on the vehicle is the specific operation, determine whether near field communication between the portable device and the communication terminal based on a first telecommunications standard is established or whether near field communication between the in-vehicle controller and the communication terminal based on the first telecommunications standard is established when the in-vehicle controller determines that the portable device is within the predetermined range, and generate a permission command to permit the specific operation to be performed when the in-vehicle controller determines that the near field communication based on the first telecommunications standard is established.

As described above, when the specific operation that needs permission from the authorized user is performed on the vehicle, the portable device configured to store information on the electronic lock of the vehicle is within the predetermined range around the vehicle in which communication is possible, and the near field communication between the portable device and the communication terminal of the authorized user of the vehicle based on the first telecommunications standard is established, the permission command is generated to permit the specific operation to be performed. That is, in a case where the authorized portable device configured to store the information on the electronic lock of the vehicle and the communication terminal of the authorized user of the vehicle are inside the vehicle or near the vehicle, the permission command is generated to permit the specific operation to be performed.

Accordingly, it is possible to provide a vehicle control method in a vehicle control system in which a function that is set to be unavailable can be made available as needed in a state where a portion of the functions of a vehicle is set to be unavailable.

A third aspect of the disclosure relates to a portable device including a controller. The controller is configured to communicate with a communication terminal of an authorized user of a vehicle, the controller being configured to transmit an electronic lock control signal of the vehicle and to transmit information based on whether near field communication with the communication terminal based on a first telecommunications standard is established to an in-vehicle controller of the vehicle.

Therefore, the in-vehicle controller can determine whether the near field communication with the communication terminal based on the first telecommunications standard is established.

Accordingly, it is possible to provide a portable device that is used in a vehicle control system in which a function that is set to be unavailable can be made available as needed in a state where a portion of the functions of a vehicle is set to be unavailable.

The portable device according to the third aspect of the disclosure may further include a memory configured to store an identification code of the vehicle. The controller may be configured to transmit the identification code to the vehicle in response to a request from the vehicle.

A fourth aspect of the disclosure relates to a control method for a portable device which stores information on an electronic lock of a vehicle. The control method includes performing a process of causing the portable device to transmit an electronic lock control signal of the vehicle to a communication terminal of an authorized user of the vehicle and transmit information based on whether near field communication with the communication terminal based on a first telecommunications standard is established to an in-vehicle controller of the vehicle.

Therefore, the in-vehicle controller can determine whether the near field communication with the communication terminal based on the first telecommunications standard is established.

Accordingly, it is possible to provide a control method for a portable device that is used in a vehicle control method in a vehicle control system in which a function that is set to be unavailable can be made available as needed in a state where a portion of the functions of a vehicle is set to be unavailable.

A fifth aspect of the disclosure relates to an in-vehicle controller which communicates with a portable device configured to store information on an electronic lock of a vehicle, the in-vehicle controller being installed in the vehicle, the portable device or the in-vehicle controller having a function of communicating with a communication terminal of an authorized user of the vehicle. The in-vehicle controller includes a collation electronic control device configured to determine whether an operation requested to be performed on the vehicle is a specific operation that needs permission from the authorized user, determine whether the portable device is within a predetermined range around the vehicle in which communication is performed when the collation electronic control device determines that the operation requested to be performed on the vehicle is the specific operation, determine whether near field communication between the portable device and the communication terminal based on a first telecommunications standard is established or whether near field communication between the in-vehicle controller and the communication terminal based on the first telecommunications standard is established when the collation electronic control device determines that the portable device is within the predetermined range, and generate a permission command to permit the specific operation to be performed when the collation electronic control device determines that the near field communication based on the first telecommunications standard is established.

A sixth aspect of the disclosure relates to a control method for an in-vehicle controller which communicates with a portable device configured to store information on an electronic lock of a vehicle, the in-vehicle controller being installed in the vehicle, the portable device or the in-vehicle controller having a function of communicating with a communication terminal of an authorized user of the vehicle. The control method includes performing a process of causing the in-vehicle controller to determine whether an operation requested to be performed on the vehicle is a specific operation that needs permission from the authorized user, determine whether the portable device is within a predetermined range around the vehicle in which communication is performed when the in-vehicle controller determines that the operation requested to be performed on the vehicle is the specific operation, determine whether near field communication between the portable device and the communication terminal based on a first telecommunications standard is established or whether near field communication between the in-vehicle controller and the communication terminal based on the first telecommunications standard is established when the in-vehicle controller determines that the portable device is within the predetermined range, and generate a permission command to permit the specific operation to be performed when the in-vehicle controller determines that the near field communication based on the first telecommunications standard is established.

It is possible to provide a vehicle control system, a vehicle control method in a vehicle control system, a portable device, a control method for a portable device, an in-vehicle controller, and a control method for an in-vehicle controller in which a function that is set to be unavailable can be made available as needed in a state where a portion of the functions of a vehicle is set to be unavailable.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a vehicle control system, a vehicle control method in a vehicle control system, a portable device, a control method for a portable device, an in-vehicle controller, and a control method for an in-vehicle controller according to an embodiment of the disclosure will be described.

Embodiment

Figure 1:
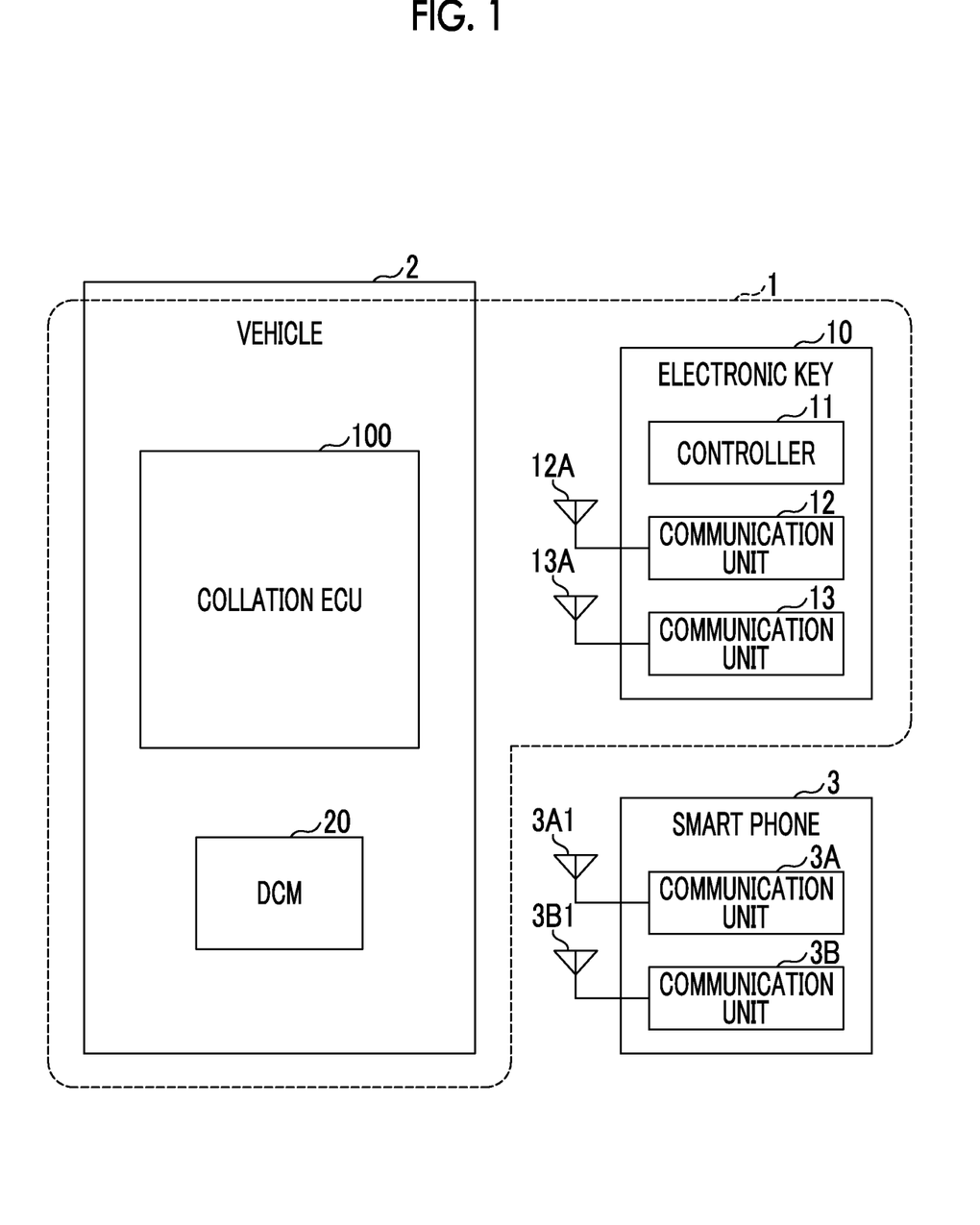
FIG. 1 is a diagram illustrating a vehicle control system according to an embodiment.

FIG. 1 is a diagram illustrating a vehicle control system 1 according to the embodiment. The vehicle control system 1 includes a collation electronic control unit (ECU) 100, an authorized electronic key 10, and a data communication module (DCM) 20. The collation ECU 100 and the DCM 20 are installed in a vehicle 2 and the authorized electronic key 10 is carried by an authorized user of the vehicle 2.

Here, the authorized electronic key 10 refers to an electronic key of which an internal memory stores an identification (ID) code unique to the vehicle 2. The ID code is an example of information on an electronic lock and the electronic key 10 as described above can be regarded as the authorized electronic key 10. Locking or unlocking the vehicle 2, starting a power system of a hybrid vehicle or a power system of an electric vehicle (EV), or starting an engine of an engine vehicle can be performed in a case where the authorized electronic key 10 is used. Hereinafter, unless otherwise mentioned, the expression "electronic key 10" means the authorized electronic key 10.

The authorized user refers to an owner of the vehicle 2 or a person who is not an owner of the vehicle 2 and has a right to at least temporarily use the vehicle 2 as in the case of a leased vehicle, a rental car, or a vehicle for car sharing. On the other hand, an unauthorized user refers to a person who is temporarily entrusted with the vehicle 2 and the electronic key 10 of the authorized user and who moves or manages the vehicle 2. Examples of the unauthorized user include a valet parking staff, a hotel staff, a dealer, and a gasoline stand staff.

A smart phone 3 is a smart phone carried by the authorized user of the vehicle 2. The smart phone 3 can perform data communication with the electronic key 10 via near field communication and can perform data communication with the collation ECU 100 via mobile data communication. Examples of near field communication include Bluetooth Low Energy (BLE) and examples of the mobile data communication include wireless communication performed via a communication channel such as Third Generation (3G), Fourth Generation (4G), Long-Term Evolution (LTE), and Fifth Generation (5G).

BLE is an example of a first telecommunications standard and 3G, 4G LTE, and 5G are an example of a second telecommunications standard. In addition, for example, the following description will be made on an assumption that the smart phone 3 performs wireless communication based on LTE.

The smart phone 3 has a function of performing a call through a telephone line, a function of performing data communication via the near field communication and the mobile data communication and a function as a portable computer. In the smart phone 3, a dedicated application program for the vehicle control system 1 is installed. The smart phone 3 performs wireless communication with the electronic key 10 via the near field communication or performs wireless communication with the collation ECU 100 via the mobile data communication on a predetermined condition. The smart phone 3 is an example of a communication terminal.

In FIG. 1, communication units 3A, 3B of the smart phone 3 are illustrated but a functional block realizing another function is omitted. Each of the communication units 3A, 3B is a communication unit such as a modem for the near field communication and the mobile data communication and antennae 3A1, 3B1 are respectively connected to the communication units 3A, 3B.

For example, the electronic key 10 is an electronic key that performs an operation of locking and unlocking a door or a trunk of the vehicle 2 or that makes locking and unlocking the vehicle, starting a power system of a hybrid vehicle or an EV, or starting an engine of an engine vehicle possible as in the case of a smart entry and start system. The electronic key 10 is an example of a portable device.

The electronic key 10 includes a central processing unit (CPU), a random access memory (RAM), a read only memory (ROM), or the like and an internal memory such as the ROM of the electronic key 10 stores an ID code unique to the vehicle 2. In addition, the electronic key 10 includes a controller 11, a communication unit 12, an antenna 12A, a communication unit 13, and an antenna 13A. Furthermore, the electronic key 10 includes a button for an operation of unlocking and locking the vehicle 2, opening a trunk lid, or the like.

The controller 11 performs a control process of transmitting an ID code in response to a request from the collation ECU 100 of the vehicle 2 or the like in addition to a control process for an operation of unlocking or locking the vehicle 2 according to the contents of an operation performed on the button of the electronic key 10 or the like. The electronic key 10 transmits an electronic lock control signal that includes a locking command, an unlocking command, or an ID code to the collation ECU 100. The above-described transmission process is performed by means of a function of the electronic key 10 as a first transmission unit. In a case where the near field communication with the smart phone 3 is established, the controller 11 transmits information indicating that the near field communication is established to the collation ECU 100. The above-described transmission process is performed by means of a function of the electronic key 10 as a second transmission unit. The controller 11 is an example of the first transmission unit and a second transmission unit.

The communication unit 12 is, for example, a communication unit that communicates with the collation ECU 100 of the vehicle 2 at a frequency band of approximately 125 kHz or approximately 300 MHz. In addition to transmission of an ID code to the collation ECU 100, the communication unit 12 performs transmission of data acquired from the smart phone 3 to the collation ECU 100 on a predetermined condition, the data representing a determination result. The antenna 12A connected to the communication unit 12 is an antenna made compatible with a frequency band of 134.2 kHz or 300 MHz.

The communication unit 13 is a communication unit for the near field communication. The near field communication is communication performed at a frequency band different from a communication frequency of the communication unit 12 and is, for example, BLE. The communication unit 13 is provided in order to make data communication between the electronic key 10 and the smart phone 3 via BLE possible. The antenna 13A connected to the communication unit 13 is an antenna for communication via BLE.

In order to perform data communication between the electronic key 10 and the smart phone 3 via BLE, pairing may be performed by using a passcode or the like. Once the pairing is performed and data communication between the electronic key 10 and the smart phone 3 via BLE is made possible, the electronic key 10 and the smart phone 3 are automatically connected to each other such that the electronic key 10 and the smart phone 3 can communicate with each other via BLE when the electronic key 10 and the smart phone 3 are within a BLE communication range.

The electronic key 10 performs wireless communication with an antenna 101 that is provided in a vehicle cabin of the vehicle 2, a door handle, the trunk lid, or the like. The antenna 101 is connected to the collation ECU 100. The electronic key 10 transmits a response signal including an ID in response to a collation signal transmitted from the vehicle 2. When authentication is established on the vehicle 2 side, locking, unlocking, starting each system, or the like is made possible.

The DCM 20 is an example of a wireless communication device installed in the vehicle 2 and the DCM 20 performs wireless communication via a communication channel such as 3G LTE, and 5G The DCM 20 can be connected to a network such as the internet via the above-described communication channel. Attributable to the connection to the network, ECUs installed in the vehicle 2 including the collation ECU 100 can perform data communication through the network.

For example, the following description will be made on an assumption that the DCM 20 performs wireless communication via LTE. The collation ECU 100 will be described by using FIG. 2.

Figure 2:
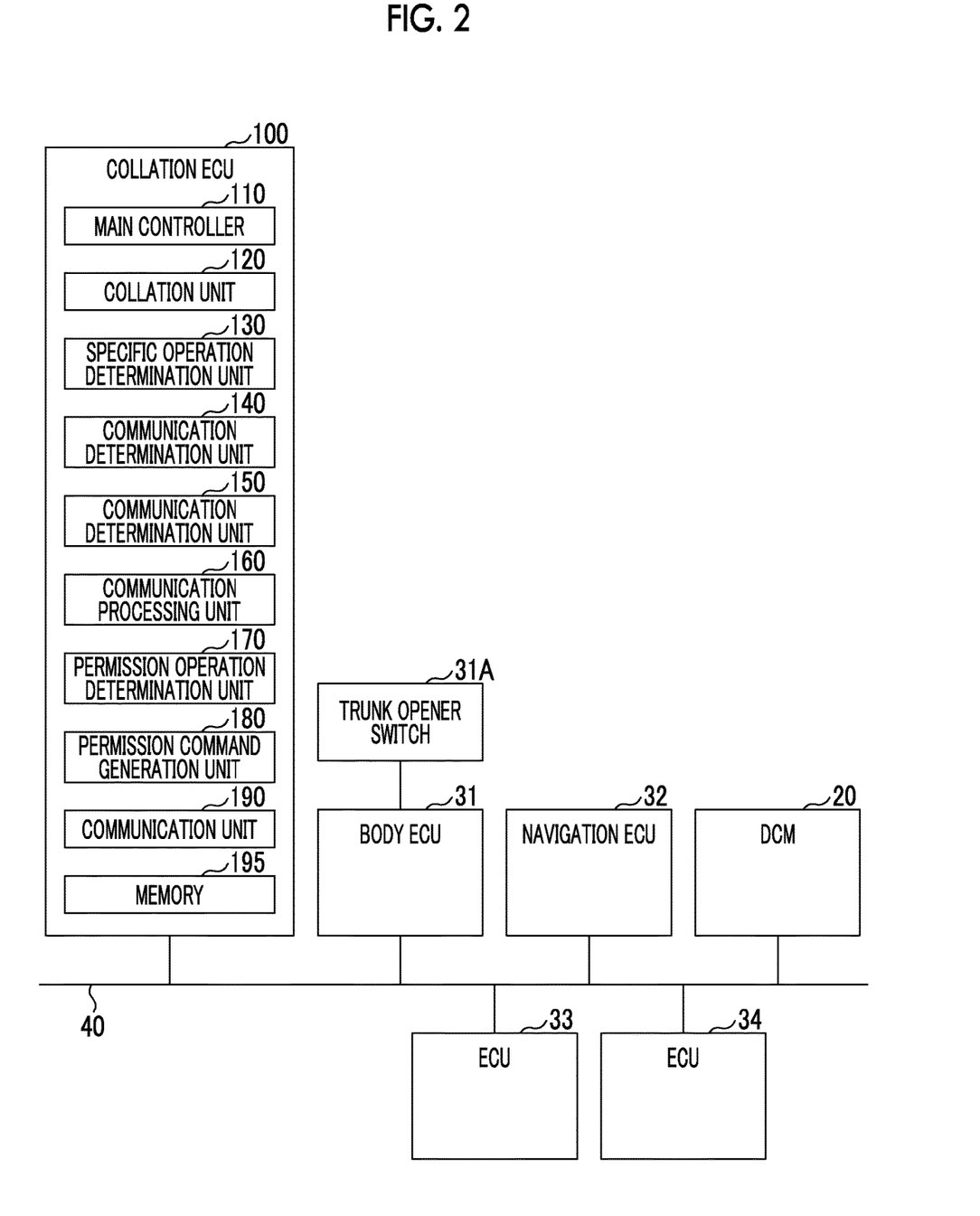
FIG. 2 is a diagram illustrating a configuration of a network system installed in a vehicle.

FIG. 2 is a diagram illustrating a configuration of a network system 2A installed in the vehicle 2. In FIG. 2, for example, the DCM 20, a body ECU 31, a navigation ECU 32, ECUs 33, 34, the collation ECU 100, and a controller area network (CAN) 40 are illustrated. The body ECU 31, the navigation ECU 32, the ECUs 33, 34, and the collation ECU 100 are realized by, for example, a computer that includes a central processing unit (CPU), a random access memory (RAM), a read only memory (ROM), a clock generator, an input and output interface, a communication interface, a transmission and reception unit, an internal bus, or the like. The DCM 20, the body ECU 31, the navigation ECU 32, the ECUs 33, 34, and the collation ECU 100 are connected to each other via the CAN 40, which is a network using a CAN protocol, such that the DCM 20, the body ECU 31, the navigation ECU 32, the ECUs 33, 34, and the collation ECU 100 can perform data communication with each other.

The body ECU 31 is an ECU that opens the trunk lid of the vehicle 2, detects an opened state of the trunk lid or a door, and performs opening and closing control or the like of a side window. A trunk opener switch 31A is connected to the body ECU 31. The trunk opener switch 31A is provided in both of the vicinity of a driver's seat in the vehicle cabin of the vehicle 2 and the trunk lid or is provided in the vicinity of a driver's seat in the vehicle cabin of the vehicle 2 or the trunk lid and it is possible to open the trunk lid by performing an operation of pressing the trunk opener switch 31A or the like.

The navigation ECU 32 is an ECU that controls a navigation system installed in the vehicle 2. The navigation ECU 32 performs searching for a route, calculation of a destination and an arrival time, route guidance, and the like. In addition, the navigation ECU 32 displays a destination history on a monitor of the navigation system when an operation of viewing the destination history is performed in a state where viewing the destination history is permitted by the collation ECU 100.

The ECUs 33, 34 are ECUs other than the collation ECU 100, the body ECU 31, and the navigation ECU 32 among ECUs installed in the vehicle 2. Here, for example, two ECUs 33, 34 are illustrated. However, a larger number of ECUs may be present in an actual case. A plurality of CANs 40 may be provided. In this case, for example, the CANs 40 may be connected to each other via a gateway device. Examples of the ECUs 33, 34 include an engine ECU, a pre-crash safety (PCS) ECU, a lane keeping assist (LKA) ECU, a brake ECU, a steering ECU, a transmission ECU, a meter ECU, and an air conditioner ECU.

The collation ECU 100 includes the antenna 101, a main controller 110, a collation unit 120, a specific operation determination unit 130, a communication determination unit 140, a communication determination unit 150, a communication processing unit 160, a permission operation determination unit 170, a permission command generation unit 180, a communication unit 190, and a memory 195. The collation ECU 100 is an example of an in-vehicle controller. Note that, the main controller 110, the collation unit 120, the specific operation determination unit 130, the communication determination unit 140, the communication determination unit 150, the communication processing unit 160, the permission operation determination unit 170, the permission command generation unit 180, and the communication unit 190 are functions of a program executed by the collation ECU 100 represented as functional blocks.

The main controller 110 is a processing unit that performs a process other than processes performed by the collation unit 120, the specific operation determination unit 130, the communication determination unit 140, the communication determination unit 150, the communication processing unit 160, the permission operation determination unit 170, the permission command generation unit 180, and the communication unit 190 and that manages all processes in the collation ECU 100.

The collation unit 120 transmits the collation signal via the antenna 101 and performs a process of collating an ID included in the response signal and an ID stored in the memory 195 based on the response signal received from the electronic key 10.

The specific operation determination unit 130 is an example of a first determination unit that determines whether an operation requested to be performed on the vehicle 2 is a specific operation that needs permission from the authorized user of the vehicle 2 or not. The specific operation is an unnecessary operation that cannot be performed without permission from the authorized user and that is not related to movement of the vehicle 2. Examples of the specific operation include an operation on the trunk opener switch 31A that is performed to open the trunk lid and an operation of viewing the destination history registered in the navigation system.

The specific operation determination unit 130 determines whether an operation requested to be performed on the vehicle 2 is the specific operation by comparing (collating) the operation requested to be performed on the vehicle 2 with specific operation information stored in the memory 195. A method of comparing (collating) the specific operation information and the operation requested to be performed on the vehicle 2 will be described later by using FIGS. 3, 4A, and 4B.

Even when any specific operation is performed on the vehicle 2, an ECU (any of ECUs 31 to 34) to which control related to an operation corresponding to the specific operation is assigned cannot perform an operation according to the specific operation as long as the ECU does not receive a permission command generated by the permission command generation unit 180. For example, even when the trunk opener switch 31A is operated, the body ECU 31 cannot open the trunk lid in a state where the body ECU 31 receives no permission command generated by the permission command generation unit 180. In this case, the body ECU 31 masks (ignores) an operation command that is generated when the trunk opener switch 31A is operated. The same applies to a specific operation other than the operation on the trunk opener switch 31A.

The communication determination unit 140 is an example of a second determination unit that determines whether the electronic key 10 is within a predetermined range around the vehicle 2 in which communication is possible when the specific operation determination unit 130 determines that the operation requested to be performed on the vehicle 2 is the specific operation. The determination on whether the electronic key 10 is within the predetermined range around the vehicle 2 is performed as a precondition for determining whether to permit the specific operation. Here, the predetermined range is a range in which the antenna 101 of the vehicle 2 and the electronic key 10 can communicate with each other and is, for example, an approximately spherical region around the antenna 101 that has a radius of approximately 1 m.

The communication determination unit 150 is an example of a third determination unit that determines whether the near field communication between the electronic key 10 and the smart phone 3 via BLE is established or not or determines whether the near field communication between the collation ECU 100 and the smart phone 3 via BLE is established or not when the communication determination unit 140 determines that the electronic key 10 is within the predetermined range. BLE is an example of communication based on the first telecommunications standard.

When the electronic key 10 is within the predetermined range around the vehicle 2 and the near field communication between the electronic key 10 and the smart phone 3 via BLE is established in a case where the specific operation on the vehicle 2 is performed, the specific operation is permitted. For this reason, the above-described communication is performed. Information indicating that the near field communication is established is transmitted from the electronic key 10 to the collation ECU 100.

The communication processing unit 160 is a processing unit that is connected to the smart phone 3 via communication via LTE with a communication range wider than that of the near field communication and that transmits a display command to display an image of an operation screen on which whether to permit the specific operation is input when the communication determination unit 150 determines that the near field communication via BLE is not established. This is for connecting the collation ECU 100 and the smart phone 3 to each other via LTE and for requesting the authorized user to determine whether to permit the specific operation or not in a case where the specific operation is performed on the vehicle 2, the electronic key 10 is present in the predetermined range around the vehicle 2, and the electronic key 10 and the smart phone 3 are not connected with each other via BLE.

In order to connect the communication processing unit 160 and the smart phone 3 to each other through communication via LTE, an IP (Internet protocol) address or the like of the smart phone 3 may be stored in the memory 195. The image displayed on the smart phone 3 will be described later by using FIG. 5.

The permission operation determination unit 170 is an example of a fourth determination unit that determines whether an operation of permitting the specific operation has been performed on the smart phone 3 connected via the communication processing unit 160 by the authorized user. This is for requesting the authorized user to determine whether to permit the specific operation or not in a case where the electronic key 10 is present near the vehicle 2 but the smart phone 3 and the electronic key 10 are not connected to each other via BLE as described above.

The permission command generation unit 180 is a processing unit that generates a permission command to permit the specific operation when the specific operation is performed on the vehicle 2, the electronic key 10 is present in the predetermined range around the vehicle 2, and the communication determination unit 150 determines that the near field communication with the electronic key 10 via BLE is established.

The permission command generation unit 180 generates the permission command to permit the specific operation when the permission operation determination unit 170 determines that an operation of permitting the specific operation has been performed in a case where the specific operation is performed on the vehicle 2, the electronic key 10 is present in the predetermined range around the vehicle 2, the electronic key 10 and the smart phone 3 are not connected to each other via BLE, and the collation ECU 100 and the smart phone 3 are connected to each other via LTE.

The communication unit 190 is a communication unit that performs data transmission and reception between the collation ECU 100 and the CAN 40. The collation ECU 100 is connected to the DCM 20 via the communication unit 190 and the CAN 40 and can perform data communication with the smart phone 3 via the DCM 20.

The memory 195 is an internal memory that stores data needed for a collation process or the like of the collation ECU 100 and is an example of a storage unit. The memory 195 is configured of a ROM or the like. The memory 195 stores the same ID code as the ID code unique to the vehicle 2 that is stored in the memory in the electronic key 10, the specific operation information, and operation information.

The specific operation information and the operation information will be described by using FIGS. 3, 4A, and 4B.

Figure 3:
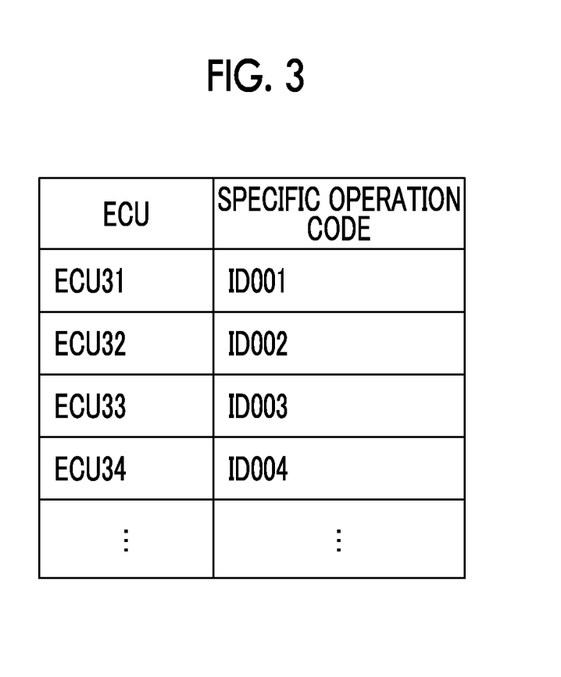
FIG. 3 is a diagram illustrating the data structure of a specific operation information database.

FIG. 3 is a diagram illustrating the data structure of a specific operation information database. The specific operation information database is data in which codes (specific operation codes), each of which represents an operation that cannot be performed without permission from the authorized user among operations that may be performed on the vehicle 2 and that corresponds to the unnecessary operation (specific operation) not related to movement of the vehicle 2, are compiled in the form of a table and the specific operation information database is stored in the memory 195.

FIG. 3 illustrates a database in which specific operation codes are registered in association with the IDs of the ECUs. The IDs (ECU 31, ECU 32, ECU 33, and ECU 34) of the ECUs are IDs that are respectively assigned to the body ECU 31, navigation ECU 32, the ECU 33, and the ECU 34.

For example, a specific operation code ID001 corresponds to an operation on the trunk opener switch 31A and a specific operation code ID002 corresponds to an operation of displaying the destination history registered in the navigation system. The specific operation codes ID001, ID002 are respectively associated with the IDs of the body ECU 31 and the navigation ECU 32. Specific operation codes ID003, ID004 are specific operation codes assigned to specific operations that are performed on a switch or the like of a device or the like in the vehicle 2 that is controlled by the ECUs 33, 34.

As described above, in the specific operation information database, the IDs of the body ECU 31, the navigation ECU 32, the ECU 33, and the ECU 34 are registered in association with the specific operation codes. Although FIG. 3 illustrates the specific operation information related to the body ECU 31, the navigation ECU 32, the ECU 33, and the ECU 34, similar specific operation information related to another ECU installed in the vehicle 2 is also present and is stored in the memory 195.

An operation as the specific operation may be set in the vehicle 2 at the time of factory shipment and may be set by the authorized user according to the authorized user's preference. When the authorized user sets the specific operation, the authorized user may set the specific operation by operating an operation unit in the vehicle cabin of the vehicle 2, may set the specific operation by using a personal computer (PC) of the authorized user via the DCM 20, and may set the specific operation by using the smart phone 3. The dealer may set the specific operation according to the authorized user's preference.

Figure 4A:
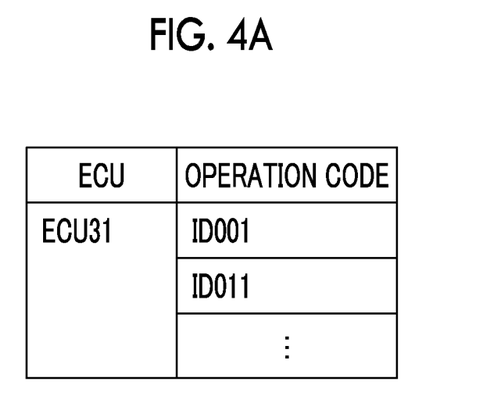
FIG. 4A is a diagram illustrating the data structure of an operation information database held by an ECU.
Figure 4B:
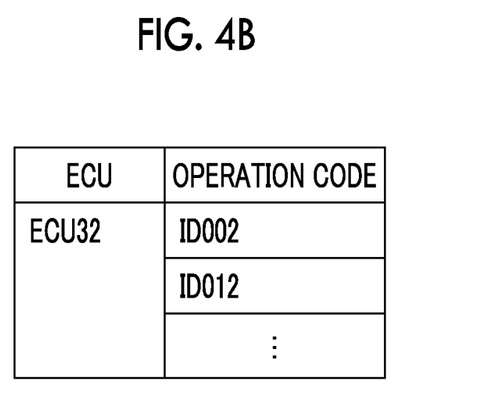
FIG. 4B is a diagram illustrating the data structure of an operation information database held by an ECU.

FIGS. 4A and 4B are diagrams, each of which illustrates the data structure of an operation information database held by an ECU. Here, for example, FIG. 4A illustrates the data structure of operation information that is stored in an internal memory of the body ECU 31 and FIG. 4B illustrates the data structure of operation information that is stored in an internal memory of the navigation ECU 32.

The operation information is a code (operation code) that represents the contents of an operation requested to be performed on the switch or the like of the device or the like in the vehicle 2. The operation information is present for each ECU since the operation information is stored in an internal memory of each ECU.

In the operation information on the body ECU 31 that is illustrated in FIG. 4A, the ID (ECU 31) of the body ECU 31 and operation codes ID001, ID011 are associated with each other. For example, the operation code ID001 corresponds to an operation on the trunk opener switch 31A and the operation code ID011 corresponds to an operation on the door handle of the driver's seat. Note that, although FIG. 4A illustrates the operation codes ID001, ID011 as an example, the operation information on the body ECU 31 includes an operation code other than the operation codes ID001, ID011.

In the operation information on the navigation ECU 32 that is illustrated in FIG. 4B, the ID (ECU 32) of the navigation ECU 32 and operation codes ID002, ID012 are associated with each other. For example, the operation code ID002 corresponds to an operation of displaying the destination history registered in the navigation system and the operation code ID012 corresponds to an operation of switching between a turned-on state and a turned-off state of the navigation system. Note that, although FIG. 4B illustrates the operation codes ID002, ID012 as an example, the operation information on the navigation ECU 32 includes an operation code other than the operation codes ID002, ID012.

As described above, in the operation information database held by the body ECU 31 and the navigation ECU 32, the IDs of the body ECU 31 and the navigation ECU 32 are registered in association with the operation codes. The same applies to the ECUs 33, 34 and another ECU installed in the vehicle 2.

When an operation is performed on the switch or the like of the device or the like in the vehicle 2, the body ECU 31, the navigation ECU 32, the ECU 33, or the ECU 34 outputs an operation code representing the contents of the operation performed on the switch or the like to the CAN 40. A CAN frame including the operation code is transmitted by the CAN 40.

The specific operation determination unit 130 acquires the CAN frame including the operation code from the CAN 40, reads the operation code, and compares (collates) the operation code with the specific operation code included in the specific operation information to determine whether an operation requested to be performed on the vehicle 2 is the specific operation or not.

Figure 5:
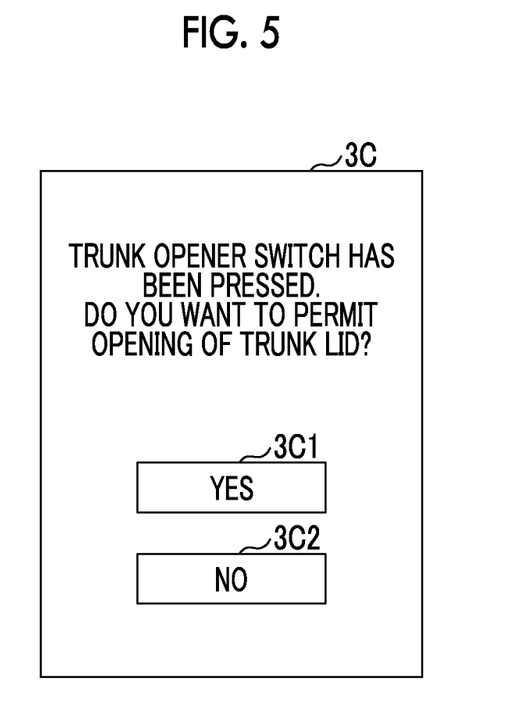
FIG. 5 is a diagram illustrating an example of an image displayed on a display of a smart phone of an authorized user.

FIG. 5 is a diagram illustrating an example of an image displayed on a display 3C of the smart phone 3 of the authorized user. When the specific operation is performed on the vehicle 2 with communication between the smart phone 3 of the authorized user and the electronic key 10 via BLE not being established, the communication processing unit 160 transmits the display command to the smart phone 3 to display the operation screen on which whether to permit the specific operation is input on the display 3C via the DCM 20 in order to inquire of the authorized user whether to permit the specific operation. Then, attributable to the above-described display command, an image as illustrated in FIG. 5 that includes a message and GUI buttons 3C1, 3C2 is displayed on the display 3C of the smart phone 3.

FIG. 5 illustrates an image that is displayed on the display 3C of the smart phone 3 when an inquiry is performed by the communication processing unit 160. FIG. 5 illustrates a state where a message "TRUNK OPENER SWITCH HAS BEEN PRESSED. DO YOU WANT TO PERMIT OPENING OF TRUNK LID?" and buttons 3C1, 3C2 corresponding to "YES" and "NO" are displayed on the display 3C. The buttons 3C1, 3C2 are buttons displayed as images in a graphical user interface (GUI) and the authorized user can select whether to permit opening of the trunk lid (YES) or not (NO) by touching any of the buttons 3C1, 3C2 with a finger or the like of the authorized user since the display 3C is provided with a touch panel. Data representing the contents of an operation on the buttons 3C1, 3C2 represents the result of determination on whether the authorized user has permitted the specific operation.

The smart phone 3 transmits data representing the result of the determination performed by the authorized user to the DCM 20 via a network such as the Internet when any of the buttons 3C1, 3C2 is operated. As a result, the collation ECU 100 acquires the data representing the result of the determination performed by the authorized user and the collation ECU 100 determines whether to generate the permission command according to the contents of the determination result. When the permission command is generated, the permission command is transmitted from the collation ECU 100 to a corresponding ECU via the CAN 40 and the corresponding ECU permits the specific operation.

Figure 6:
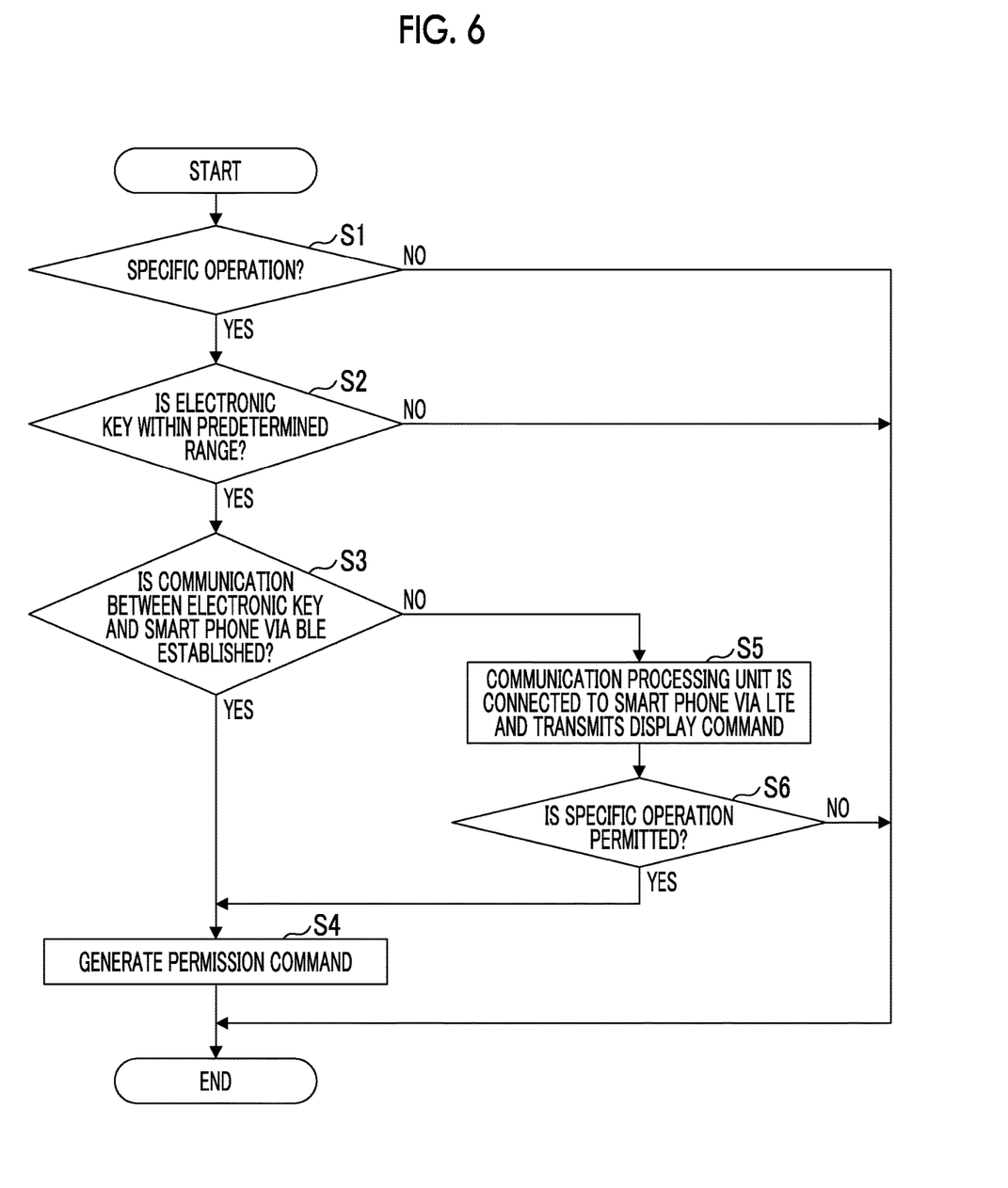
FIG. 6 is a flowchart illustrating a process performed by a collation ECU.

FIG. 6 is a flowchart illustrating a process performed by the collation ECU 100. A processing method illustrated in FIG. 6 is a vehicle control method in a vehicle control system. The collation ECU 100 repeats a flow illustrated in FIG. 6 at predetermined intervals. That is, the collation ECU 100 repeats the flow illustrated in FIG. 6 at predetermined intervals even when the vehicle 2 is in a stopped state with a door lock being locked. The predetermined interval is, for example, three seconds.

When an operation is performed on the vehicle 2, the specific operation determination unit 130 determines whether the operation is the specific operation (step S1). More specifically, the specific operation determination unit 130 determines whether the operation is the specific operation by comparing (collating) an operation code that is acquired via the CAN 40 with the specific operation code included in the specific operation information that is stored in the memory 195.

When the specific operation determination unit 130 determines that the operation requested to be performed on the vehicle 2 is the specific operation (S1: YES), the communication determination unit 140 determines whether the electronic key 10 is within the predetermined range around the vehicle 2 in which communication is possible (step S2). This is for determining whether the operation has been performed by the authorized user who is carrying the authorized electronic key 10 or the unauthorized user.

When the communication determination unit 140 determines that the electronic key 10 is within the predetermined range (S2: YES), the communication determination unit 150 determines whether the near field communication between the electronic key 10 and the smart phone 3 via BLE is established or not (step S3). This is for determining whether a user who is carrying the authorized electronic key 10 is the authorized user or the unauthorized user.

When the communication determination unit 150 determines that the near field communication via BLE is established (S3: YES), the main controller 110 causes the flow to proceed to step S4.

The permission command generation unit 180 generates the permission command to permit the specific operation requested to be performed on the vehicle 2 (step S4). Then, the main controller 110 causes the communication unit 190 to output the permission command generated by the permission command generation unit 180 to the CAN 40. As a result, an ECU (any of ECUs 31 to 34) that receives the permission command performs the specific operation.

For example, the description above relates to a case where a permission command is generated due to the authorized user of the vehicle 2 pressing the trunk opener switch 31A while carrying the electronic key 10 and the smart phone 3. Since the permission command is a command to permit opening of the trunk lid, the body ECU 31 receiving the permission command opens the trunk lid. Since communication between the electronic key 10 and the smart phone 3 via BLE being established may mean that the vehicle 2 is being used by the authorized user, the specific operation is permitted when communication between the electronic key 10 and the smart phone 3 via BLE being established is confirmed.

When a process in step S4 ends, one cycle of the process in the flowchart illustrated in FIG. 6 ends (END). The flow illustrated in FIG. 6 is repeated by the collation ECU 100 when the predetermined interval elapses.

When the communication determination unit 150 determines that the near field communication via BLE is not established in step S3 (S3: NO), the communication processing unit 160 is connected to the smart phone 3 through communication via LTE and transmits the display command to display the message and the buttons 3C1, 3C2 illustrated in FIG. 5 on the display 3C (refer to FIG. 5) of the smart phone 3 (step S5). This is for connecting the collation ECU 100 and the smart phone 3 to each other via LTE and for requesting the authorized user to determine whether to permit the specific operation or not.

The permission operation determination unit 170 determines whether an operation of permitting the specific operation has been performed on the smart phone 3 by the authorized user (step S6). The determination in step S6 is performed by the permission operation determination unit 170 reading the contents of the data representing the determination result that is transmitted from the smart phone 3 to the collation ECU 100. The data representing the determination result is data representing the contents of an operation on the buttons 3C1, 3C2 that is performed by the authorized user.

When the permission operation determination unit 170 determines that the operation of permitting the specific operation has been performed (S6: YES), the main controller 110 causes the flow to proceed to step S4. As a result, the permission command is generated by the permission command generation unit 180, the communication unit 190 outputs the permission command to the CAN 40, and an ECU (any of ECUs 31 to 34) that receives the permission command performs the specific operation.

For example, the description above relates to a case where the trunk opener switch 31A is pressed by a valet parking staff (unauthorized user) or the like while the authorized user of the vehicle 2 is shopping with the vehicle 2 and the electronic key 10 being left for valet parking in a department store, the operation screen for inquiring whether to open the trunk lid or not is displayed on the smart phone 3 of the authorized user, and the permission command is generated with the authorized user operating the GUI button 3C1 representing "YES". Since the permission command is a command to permit opening of the trunk lid, the body ECU 31 receiving the permission command opens the trunk lid.

In this manner, a series of processes ends. The above-described process is repeated by the collation ECU 100 at predetermined intervals.

When the specific operation determination unit 130 determines that the operation requested to be performed on the vehicle 2 is not the specific operation (S1: NO) in step S1, the main controller 110 ends the flow (END). This is because the flow illustrated in FIG. 6 does not need to be performed when the operation requested to be performed on the vehicle 2 does not correspond to the specific operation.

When the communication determination unit 140 determines that the authorized electronic key 10 is not within the predetermined range (S2: NO) in step S2, the main controller 110 ends the flow (END).

This is because a state where the authorized electronic key 10 is not within the predetermined range in which communication with the vehicle 2 can be performed is a state where an operation cannot be performed on the vehicle 2. In addition, this is for excluding a case where an electronic key other than the authorized electronic key 10 is present within the predetermined range in which communication with the vehicle 2 can be performed and the electronic key communicates with the antenna 101 of the collation ECU 100. Accordingly, in a case where the authorized electronic key 10 is not present within the predetermined range, the specific operation is not permitted even when the specific operation is performed, and thus it is possible to improve the security of the vehicle 2 in the viewpoint of preventing theft.

When the permission operation determination unit 170 determines that the operation of permitting the specific operation has not been performed (S6: NO) in step S6, the main controller 110 ends the flow (END). This is because the authorized user has determined not to permit the specific operation.

This case is, for example, a case where the trunk opener switch 31A is pressed by the valet parking staff or the like while the authorized user of the vehicle 2 is shopping with the vehicle 2 and the electronic key 10 being left for valet parking in the department store, the operation screen for inquiring whether to open the trunk lid or not is displayed on the smart phone 3 of the authorized user, and the permission command is generated with the authorized user operating the GUI button 3C2 representing "NO". In this case, since the specific operation is not permitted, the flow ends.

As described above, in a case where the specific operation is performed on the switch or the like in the vehicle 2, the collation ECU 100 permits the specific operation when the electronic key 10 is within the predetermined range in which communication is possible and the near field communication between the electronic key 10 and the smart phone 3 via BLE being established is confirmed.

Therefore, the specific operation can be permitted in a case where the authorized user of the vehicle 2 performs a specific operation of pressing the trunk opener switch 31A or the like while carrying the electronic key 10 and the smart phone 3.

In a case where the specific operation is performed on the switch or the like in the vehicle 2, the collation ECU 100 permits the specific operation when the electronic key 10 is within the predetermined range in which communication is possible and the collation ECU 100 receives the determination result indicating that the specific operation is permitted from the smart phone 3 through a network via LTE even though the near field communication between the electronic key 10 and the smart phone 3 via BLE being established is not confirmed.

Therefore, the specific operation can be permitted in a case where the authorized user determines that the vehicle 2 needs to be operated according to the specific operation in a situation where the authorized user of the vehicle 2 has entrusted another person (for example, unauthorized user such as valet parking staff) with the vehicle 2 and the other person performs the specific operation.

Accordingly, it is possible to provide the vehicle control system 1 and a vehicle control method in the vehicle control system 1 in which a function that is set to be unavailable can be made available as needed in a state where a portion of the functions of the vehicle 2 is set to be unavailable.

Hereinabove, an embodiment in which the electronic key 10 has a BLE communication function and can communicate with the smart phone 3 via BLE and determination on whether the near field communication between the electronic key 10 and the smart phone 3 via BLE is established is performed in step S3 has been described.

However, the collation ECU 100 may be made be able to communicate with the smart phone 3 via BLE and in the process in step S3, determination on whether the near field communication between the collation ECU 100 and the smart phone 3 via BLE is established may be performed instead of making the electronic key 10 have the BLE communication function. This is because it is possible to determine whether the authorized user is near the vehicle 2 or not even in a case where the determination as described above is performed.

Hereinabove, an embodiment in which the specific operation is an operation on a trunk lid opener switch that is performed to open the trunk lid, an operation of viewing the destination history registered in the navigation system, or the like has been described. However, the specific operation may be an operation other than those described above as long as the specific operation is an operation that cannot be performed without permission from the authorized user that is the unnecessary operation not related to movement of the vehicle 2.

Hereinabove, an embodiment in which the collation ECU 100, the body ECU 31, the navigation ECU 32, the ECUs 33, 34, and the DCM 20 of the network system 2A are connected to each other via the CAN 40 has been described. However, instead of the CAN 40, a network using a protocol such as Ethernet (registered trademark), Local Interconnect Network (LIN), or the like may be used.

Hereinabove, the vehicle control system, the vehicle control method in a vehicle control system, the portable device, the control method for a portable device, the in-vehicle controller, and the control method for an in-vehicle controller according to an exemplary embodiment of the disclosure has been described. However, the disclosure is not limited to the specifically disclosed embodiment and various modifications and changes can be made without departing from the scope of the claims.

What is claimed is:

1. A vehicle control system comprising:
a portable device configured to store information on an electronic lock of a vehicle; and
an in-vehicle controller configured to communicate with the portable device, the in-vehicle controller being installed in the vehicle, the portable device or the in-vehicle controller having a function of communicating with a communication terminal of an authorized user of the vehicle,
wherein the in-vehicle controller is configured to, in the following order:
determine whether an operation requested to be performed on the vehicle is a specific operation that needs permission from the authorized user,
determine whether the portable device is within a predetermined range around the vehicle in which communication is performed when the in-vehicle controller determines that the operation requested to be performed on the vehicle is the specific operation,
determine whether near field communication between the portable device and the communication terminal based on a first telecommunications standard is established or whether near field communication between the in-vehicle controller and the communication terminal based on the first telecommunications standard is established when the in-vehicle controller determines that the portable device is within the predetermined range, and
generate a permission command to permit the specific operation to be performed when the in-vehicle controller determines that the near field communication based on the first telecommunications standard is established.

2. The vehicle control system according to claim 1, wherein the in-vehicle controller is configured not to determine whether the near field communication based on the first telecommunications standard is established and not to generate the permission command when the in-vehicle controller determines that the portable device is not within the predetermined range.

3. The vehicle control system according to claim 1, wherein:
the in-vehicle controller is configured to be connected to the communication terminal via communication based on a second telecommunications standard with a communication range wider than a communication range of the near field communication and to cause the communication terminal to display an operation screen on which whether to permit the specific operation to be performed is input when the in-vehicle controller determines that the near field communication based on the first telecommunications standard is not established;
the in-vehicle controller is configured to determine whether an operation of permitting the specific operation has been performed on the communication terminal connected to the in-vehicle controller by the authorized user; and
the in-vehicle controller is configured to generate the permission command to permit the specific operation to be performed when the in-vehicle controller determines that the operation of permitting the specific operation has been performed.

4. The vehicle control system according to claim 1, wherein:
the in-vehicle controller is configured to store specific operation information representing the specific operation; and
the in-vehicle controller is configured to determine whether the operation requested to be performed on the vehicle is the specific operation by comparing the operation requested to be performed on the vehicle with the stored specific operation information.

5. A vehicle control method in a vehicle control system which includes a portable device configured to store information on an electronic lock of a vehicle and an in-vehicle controller configured to communicate with the portable device, the in-vehicle controller being installed in the vehicle, the portable device or the in-vehicle controller having a function of communicating with a communication terminal of an authorized user of the vehicle, the vehicle control method comprising performing a process of causing the in-vehicle controller to, in the following order:
determine whether an operation requested to be performed on the vehicle is a specific operation that needs permission from the authorized user,
determine whether the portable device is within a predetermined range around the vehicle in which communication is performed when the in-vehicle controller determines that the operation requested to be performed on the vehicle is the specific operation,
determine whether near field communication between the portable device and the communication terminal based on a first telecommunications standard is established or whether near field communication between the in-vehicle controller and the communication terminal based on the first telecommunications standard is established when the in-vehicle controller determines that the portable device is within the predetermined range, and generate a permission command to permit the specific operation to be performed when the in-vehicle controller determines that the near field communication based on the first telecommunications standard is established.

6. The vehicle control method according to claim 5, wherein the determination on whether the near field communication based on the first telecommunications standard is established is not made and the permission command is not generated when the in-vehicle controller determines that the portable device is not within the predetermined range.

7. The vehicle control method according to claim 5, further comprising performing a process of causing the in-vehicle controller to be connected to the communication terminal via communication based on a second telecommunications standard with a communication range wider than a communication range of the near field communication and cause the communication terminal to display an operation screen on which whether to permit the specific operation to be performed is input when the in-vehicle controller determines that the near field communication based on the first telecommunications standard is not established, determine whether an operation of permitting the specific operation has been performed on the communication terminal connected to the in-vehicle controller by the authorized user, and generate the permission command to permit the specific operation to be performed when the in-vehicle controller determines that the operation of permitting the specific operation has been performed.

8. The vehicle control method according to claim 5, wherein:

the in-vehicle controller is configured to store specific operation information representing the specific operation; and the vehicle control method further comprises performing a process of causing the in-vehicle controller to determine whether the operation requested to be performed on the vehicle is the specific operation by comparing the operation requested to be performed on the vehicle with the stored specific operation information.

9. An in-vehicle controller which communicates with a portable device configured to store information on an electronic lock of a vehicle, the in-vehicle controller being installed in the vehicle, the portable device or the in-vehicle controller having a function of communicating with a communication terminal of an authorized user of the vehicle, the in-vehicle controller comprising a collation electronic control device configured to, in the following order:

determine whether an operation requested to be performed on the vehicle is a specific operation that needs permission from the authorized user, determine whether the portable device is within a predetermined range around the vehicle in which communication is performed when the collation electronic control device determines that the operation requested to be performed on the vehicle is the specific operation, determine whether near field communication between the portable device and the communication terminal based on a first telecommunications standard is established or whether near field communication between the in-vehicle controller and the communication terminal based on the first telecommunications standard is established when the collation electronic control device determines that the portable device is within the predetermined range, and generate a permission command to permit the specific operation to be performed when the collation electronic control device determines that the near field communication based on the first telecommunications standard is established.

10. A control method for an in-vehicle controller which communicates with a portable device configured to store information on an electronic lock of a vehicle, the in-vehicle controller being installed in the vehicle, the portable device or the in-vehicle controller having a function of communicating with a communication terminal of an authorized user of the vehicle, the control method comprising performing a process of causing the in-vehicle controller to, in the following order:

determine whether an operation requested to be performed on the vehicle is a specific operation that needs permission from the authorized user, determine whether the portable device is within a predetermined range around the vehicle in which communication is performed when the in-vehicle controller determines that the operation requested to be performed on the vehicle is the specific operation, determine whether near field communication between the portable device and the communication terminal based on a first telecommunications standard is established or whether near field communication between the in-vehicle controller and the communication terminal based on the first telecommunications standard is established when the in-vehicle controller determines that the portable device is within the predetermined range, and generate a permission command to permit the specific operation to be performed when the in-vehicle controller determines that the near field communication based on the first telecommunications standard is established.

* * * * *